(12) United States Patent
Morita et al.

(10) Patent No.: US 9,614,664 B2
(45) Date of Patent: Apr. 4, 2017

(54) WIRELESS COMMUNICATION APPARATUS AND METHOD

(71) Applicant: Panasonic Intellectual Property Management Co., Ltd., Osaka (JP)

(72) Inventors: Tadashi Morita, Kanagawa (JP); Yukio Okazaki, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/156,333

(22) Filed: May 17, 2016

(65) Prior Publication Data

US 2016/0352507 A1 Dec. 1, 2016

(30) Foreign Application Priority Data

May 25, 2015 (JP) .................................. 2015-105549

(51) Int. Cl.
*H04L 7/06* (2006.01)
*H04L 7/00* (2006.01)

(52) U.S. Cl.
CPC .............. *H04L 7/06* (2013.01); *H04L 7/0016* (2013.01)

(58) Field of Classification Search
CPC ................................. H04L 7/06; H04L 7/0016
USPC .......................... 375/364; 340/572.2; 455/68
See application file for complete search history.

(56) References Cited

U.S. PATENT DOCUMENTS

| 5,063,529 A * | 11/1991 | Chapoton | H01Q 3/267 342/174 |
|---|---|---|---|
| 2004/0203472 A1* | 10/2004 | Chien | H04B 1/30 455/68 |
| 2009/0261976 A1* | 10/2009 | Oung | G08B 13/2471 340/572.2 |
| 2012/0256673 A1 | 10/2012 | Fujibayashi | |

FOREIGN PATENT DOCUMENTS

WO 2011/121979 10/2011

OTHER PUBLICATIONS

Kuba Raczkowski et al., "A Wideband Beamformer for a Phased-Array 60 GHz Receiver in 40 nm Digital CMOS", Dig Tech Pap IEEE Int Solid-State Circuits Conference, 2010.

* cited by examiner

*Primary Examiner* — Daniel Washburn
*Assistant Examiner* — Fitwi Hailegiorgis
(74) *Attorney, Agent, or Firm* — Seed IP Law Group LLP

(57) ABSTRACT

A wireless communication apparatus includes multiple antenna devices, a signal generator, a phase shifter, a phase controller, and a quadrature error corrector (phase error corrector and amplitude error corrector). The signal generating circuitry, in operation, generates an IQ signal having an I signal and a Q signal. The plurality of phase shifting circuitry provided for each of the plurality of antenna devices, in operation, generates a plurality of combination signals by combining the I signal and the Q signal based on a predetermined combining scheme. The phase controlling circuitry, in operation, controls the predetermined combining scheme in each of the plurality of phase shifting circuitry. The quadrature error correcting circuitry, in operation, corrects at least one of amplitude combining scheme and phase combining scheme of the predetermined combining scheme in a correction of the predetermined combining scheme.

6 Claims, 12 Drawing Sheets

WIRELESS COMMUNICATION APPARATUS AND METHOD

BACKGROUND

1. Technical Field

The present disclosure relates to a wireless communication apparatus and method for transmitting IQ signals in a phased array system.

2. Description of the Related Art

A phased array system that performs directivity communication by using multiple antenna devices is attracting attention in various fields (for example, see RACZKOWSKI Kuba, et al., "A Wideband Beamformer for a Phased Array 60 GHz Receiver in 40 nm Digital CMOS", Dig Tech Pap IEEE Int Solid State Circuits Conf, 2010, p. 36-38.). It may be possible enhance the communication efficiency by the application of IQ modulation to the phased array system.

However, quadrature errors, such as phase errors and amplitude errors, may occur between an in-phase signal (I signal) and a quadrature signal (Q signal) which form an IQ signal. In the case of the phased array system, such quadrature errors may occur in each of the multiple antenna devices.

An example of the technology for correcting IQ signals for quadrature errors is disclosed in International Publication No. 2011/121979. In this technology (hereinafter referred to as "the related art"), an IQ correcting circuit corrects two local (LO) signals out of phase with each other for quadrature errors so as to generate an I local signal and a Q local signal. Then, the generated I local signal and Q local signal are separately input into quadrature mixers disposed in two baseband signal systems.

By applying the related art to a phased array system, wireless communication using directivity-controlled IQ signals may be performed with reduced quadrature errors.

SUMMARY

In this case, however, it is necessary to provide an analog circuit for correcting for quadrature errors for each antenna device, which increases the circuit scale.

One non-limiting and exemplary embodiment of the present disclosure provides a wireless communication apparatus and method that is able to perform directivity communication by using IQ signals corrected for quadrature errors, substantially without increasing the circuit scale.

In one general aspect, the techniques disclosed here feature a wireless communication apparatus including a plurality of antenna devices, signal generating circuitry, a plurality of phase shifting circuitry, phase controlling circuitry, and quadrature error correcting circuitry. The signal generating circuitry, in operation, generates an IQ signal having an I signal and a Q signal. The plurality of phase shifting circuitry provided for each of the plurality of antenna devices, in operation, generates a plurality of combination signals by combining the I signal and the Q signal based on a predetermined combining scheme. The phase controlling circuitry, in operation, controls the predetermined combining scheme in each of the plurality of phase shifting circuitry. The quadrature error correcting circuitry, in operation, corrects at least one of amplitude combining scheme and phase combining scheme of the predetermined combining scheme in a correction of the predetermined combining scheme.

It should be noted that general or specific embodiments may be implemented as a device, a system, a method, an integrated circuit, a computer program, a storage medium, or any selective combination thereof.

According to an aspect of the present disclosure, it is possible to perform directivity communication by using IQ signals corrected for quadrature errors, substantially without increasing the circuit scale.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments of the present disclosure will be described below in detail with reference to the accompanying drawings.

[First Embodiment]

In a first embodiment of the present disclosure, an example of a wireless communication apparatus that transmits a radio signal by using an array antenna including N antenna devices will be discussed.

(Configuration of Wireless Communication Apparatus)

The configuration of the wireless communication apparatus according to the first embodiment will first be discussed below.

Figure 1:
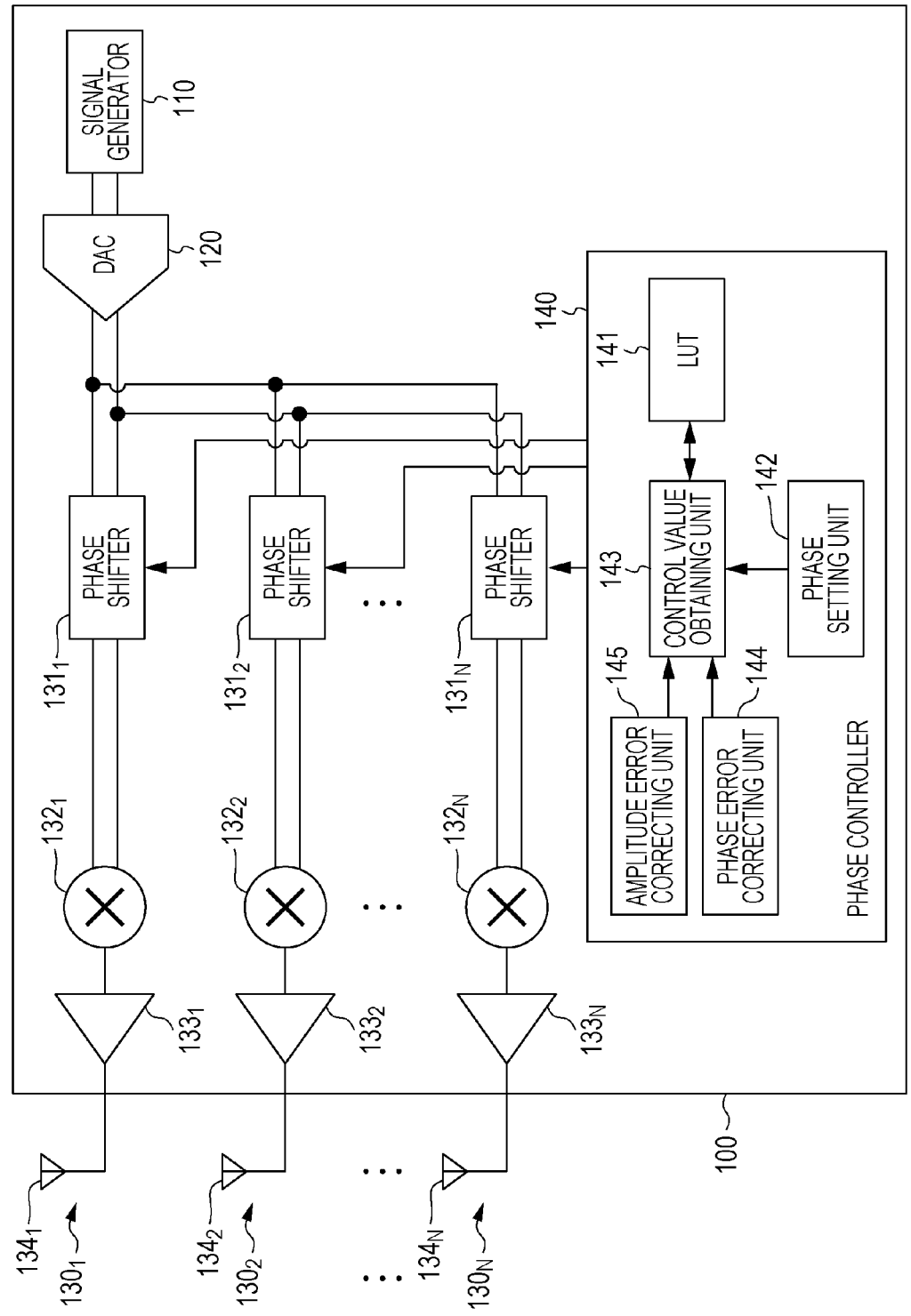
FIG. 1 illustrates an example of the configuration of a wireless communication apparatus according to a first embodiment of the present disclosure.

FIG. 1 is a block diagram illustrating an example of the configuration of a wireless communication apparatus 100 according to the first embodiment. In FIG. 1, the configuration of the wireless communication apparatus 100 including an array antenna constituted by N antenna devices is shown.

As shown in FIG. 1, the wireless communication apparatus 100 includes a signal generator 110, a digital-to-analog (D/A) converter (DAC) 120, first through N transmission branches $130_1$ through $130_N$, and a phase controller 140.

The signal generator 110 generates a digital IQ signal indicating information to be transmitted.

The D/A converter 120 performs D/A conversion to convert the generated digital IQ signal to an analog IQ signal.

The first through N transmission branches $130_1$ through $130_N$ provide different phases to the analog IQ signal so as to convert the analog IQ signal into radio frequency (RF) signals.

Each of the transmission branches 130 includes a phase shifter 131, a signal mixer 132, an RF transmitter 133, and an antenna device 134.

On the basis of control values supplied from the phase controller 140, the phase shifters 131 of the respective transmission branches 130 provide different phases to the analog IQ signal.

Figure 2:
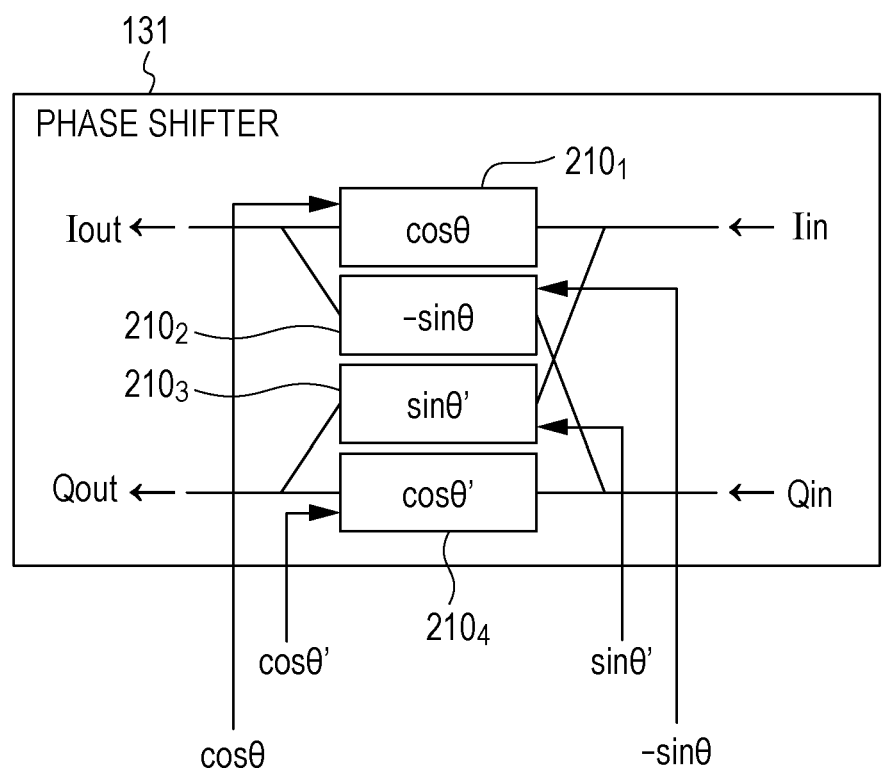
FIG. 2 illustrates an example of the configuration of a phase shifter in the first embodiment.
Figure 3:
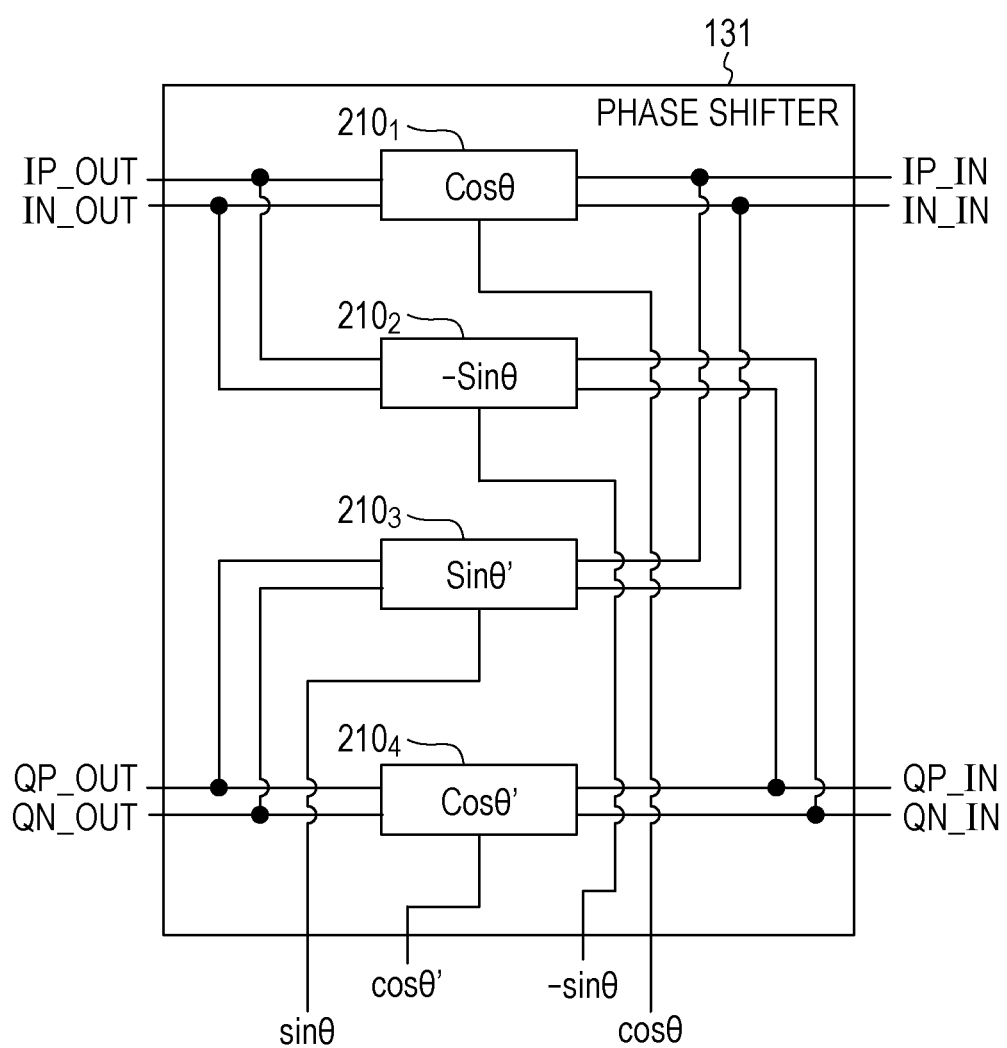
FIG. 3 illustrates details of an example of the configuration of the phase shifter in the first embodiment.

FIG. 2 shows an example of the configuration of the phase shifter 131 through illustration of calculations performed by the phase shifter 131. FIG. 3 illustrates details of an example of the configuration of the phase shifter 131 shown in FIG. 2.

In FIGS. 2 and 3, each of first through fourth multiplication blocks $210_1$ through $210_4$ integrates therein a circuit for multiplying an input current by a control value supplied from the phase controller 140 so as to amplify ("amplify" includes attenuate) the input signal in accordance with the magnitude of the control value. The control value may be a positive value or a negative value. Accordingly, each of the first through fourth multiplication blocks $210_1$ through $210_4$ has both of a function of outputting a current and a function of receiving a current.

An I component (Iin/IP_IN and IN_IN, hereinafter referred to as the "I signal") of the IQ signal is input into the first and third multiplication blocks $210_1$ and $210_3$. A Q component (Qin/QP_IN and QN_IN, hereinafter referred to as the "Q signal") of the IQ signal is input into the second and fourth multiplication blocks $210_2$ and $210_4$.

The phase shifter 131 outputs the value obtained by adding output from the first multiplication block $210_1$ and output from the second multiplication block $210_2$ to each other, as a new I signal (Iout/IP_OUT and IN_OUT) of the IQ signal. The phase shifter 131 also outputs the value obtained by adding output from the third multiplication block $210_3$ and output from the fourth multiplication block $210_4$ to each other, as a new Q signal (Qout/QP_OUT and QN_OUT) of the IQ signal.

As the control values, for example, values of cos θ, −sin θ, sin θ', and cos θ', are respectively supplied to the first through fourth multiplication blocks $210_1$ through $210_4$. The control values supplied to the first through fourth multiplication blocks $210_1$ through $210_4$ will be called first through fourth control values, respectively.

In this case, the phase shifter 131 performs processing for generating a new I signal by adding the value obtained by multiplying the value of the I signal by the first control value (cos θ) and the value obtained by multiplying the value of the Q signal by the second control value (−sin θ) to each other. The phase shifter 131 also performs processing for generating a new Q signal by adding the value obtained by multiplying the value of the I signal by the third control value (sin θ') and the value obtained by multiplying the value of the Q signal by the fourth control value (cos θ') to each other.

To put it another way, the above-described processing is equal to rotate calculations for the I signal and the Q signal. More specifically, if θ'=θ, the phase shifter 131 performs operation equal to rotate operation for rotating the I signal and the Q signal by the angle θ by multiplying the coordinates (constellation) of the input IQ signal by a rotation matrix. That is, the phase shifter 131 is able to obtain output which is equivalent to the result of performing phase rotation on the input signal by the angle θ upon receiving cos θ, −sin θ, and cos θ as the first through fourth control values.

As a result of supplying control values corresponding to different values of θ to the phase shifters 131 (transmission branches 130), different phases θ are applied to the IQ signal for the transmission branches 130, thereby implementing desired beamforming (directivity control).

Figure 4:
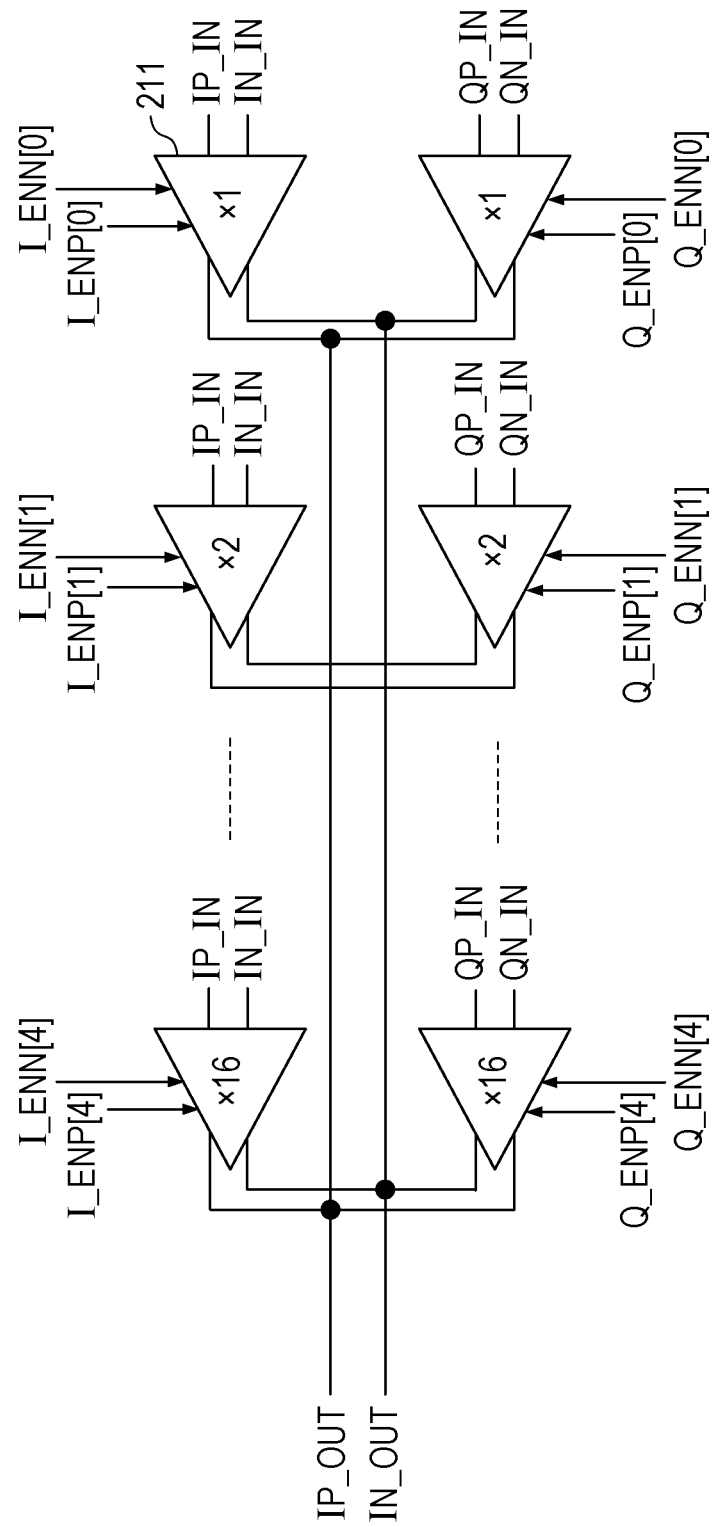
FIG. 4 illustrates an example of a partial circuit configuration of the phase shifter in the first embodiment.

FIG. 4 illustrates an example of a partial circuit configuration of the phase shifter 131. In FIG. 4, the circuit configuration corresponding to a system of the first and second multiplication blocks $210_1$ and $210_2$ in a case in which each multiplication block 210 conducts gain adjustment of five bits ($2^5$ stages) is shown.

As shown in FIG. 4, the phase shifter 131 includes five-stage amplifiers 211 having different amplification factors ×1, ×2, . . . , ×16 for each of the I signal and the Q signal. A control value for controlling the amplification factor of each amplifier 211 is a digital control signal, and the input and output values of each amplifier 211 are analog signals.

Each amplifier 211 is formed by connecting gm amplifiers (transconductance amplifiers) (not shown). The number of gm amplifiers is a power of two corresponding to the number of bits. The gm amplifier is an amplifier that serves as a non-inverting amplifier when a control signal I_ENP is enabled and that serves as an inverting amplifier when a control signal I_ENN is enabled. That is, each amplifier 211 is configured to output a positive current by making the control signal I_ENP active and to output a negative current by making the control signal I_ENN active.

Outputs from the amplifiers 211 are added. That is, the gm gain for each of the I signal and the Q signal linearly changes in accordance with the binary control signals I_ENP, I_ENN, Q_ENP, and Q_ENN. In the multiplication block 210, as a whole, by controlling the control signals I_ENP and I_ENN of each bit, $2^5$-stage gain control can be performed for each of positive components and negative components.

The phase shifter 131 also has a similar circuit configuration corresponding to a system of the third and fourth multiplication blocks $210_3$ and $210_4$, though such a configuration is not shown.

Figure 5:
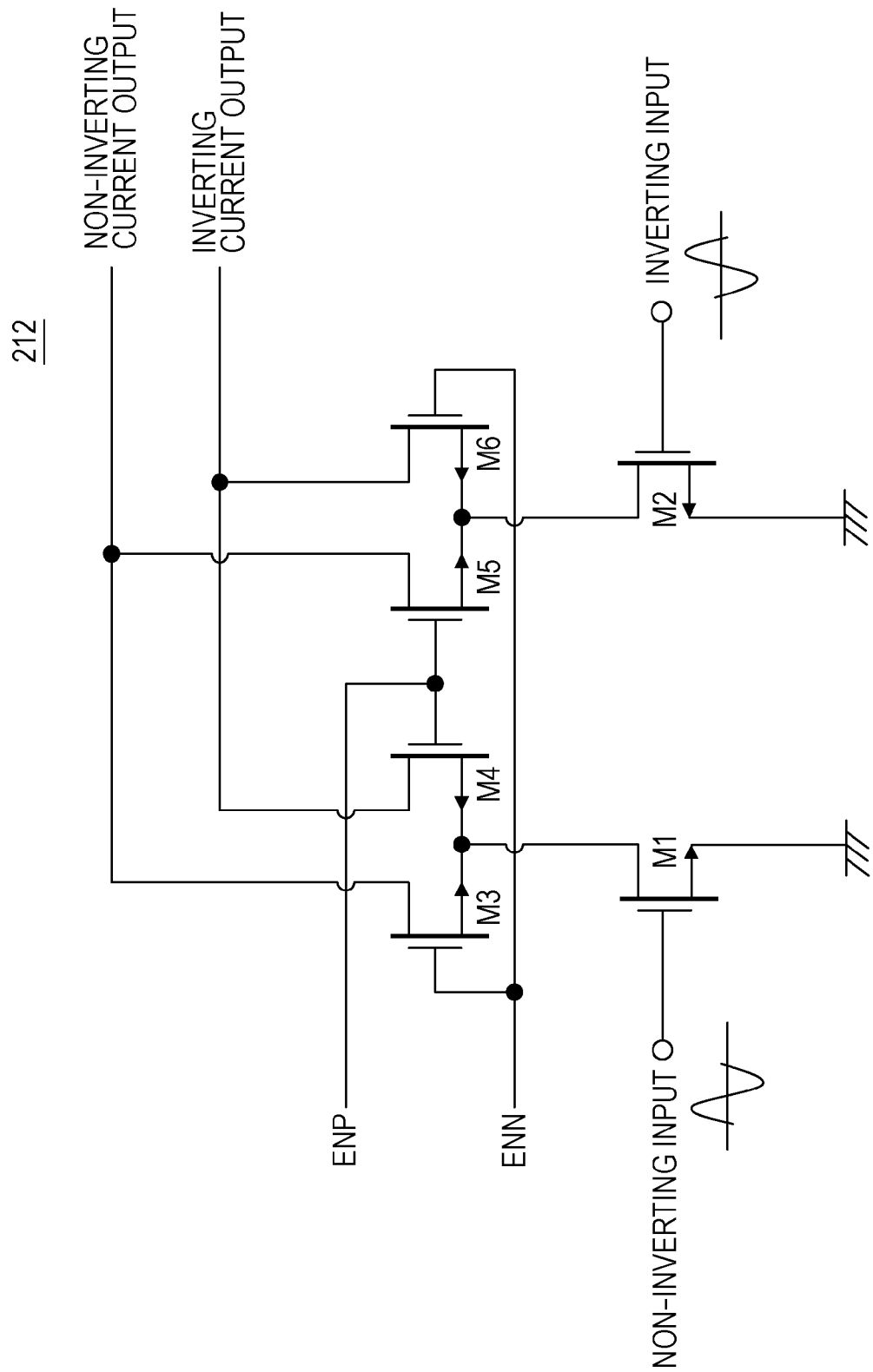
FIG. 5 illustrates an example of the configuration of a gm amplifier in the first embodiment.

FIG. 5 illustrates an example of the configuration of a gm amplifier.

As shown in FIG. 5, a gm amplifier (transconductance amplifier) 212 includes first through sixth MOS (Metal-Oxide-Semiconductor) transistors M1 through M6.

A non-inverting input voltage signal and an inverting input voltage signal are input into the gates of first and second MOS transistors M1 and M2, respectively. Drain output currents of the first and second MOS transistors M1 and M2 have a form in which the gate input voltages are inverted. That is, the first and second MOS transistors M1 and M2 form a pseudo differential amplifier.

The drain of the first MOS transistor M1 is connected to the sources of the third and fourth MOS transistors M3 and M4, while the drain of the second MOS transistor M2 is connected to the sources of the fifth and sixth MOS transistors M5 and M6. A control signal ENP is input into the gates of the fourth and fifth MOS transistors M4 and M5, while a control signal ENN is input into the gates of the third and sixth MOS transistors M3 and M6.

When the control signal ENP is Hi (high) and the control signal ENN is Lo (low), the fourth and fifth MOS transistors M4 and M5 are turned ON. The output current of the first MOS transistor M1 passes through the fourth MOS transistor M4 and is output to the inverting output, while the output current of the second MOS transistor M2 passes through the fifth MOS transistor M5 and is output to the non-inverting output. In this case, the gm amplifier 212 serves as a non-inverting amplifier.

In contrast, when the control signal ENP is Lo and the control signal ENN is Hi, the third and sixth MOS transistors M3 and M6 are turned ON. The output current of the first MOS transistor M1 passes through the third MOS transistor M3 and is output to the non-inverting output, while the output current of the second MOS transistor M2 passes through the sixth MOS transistor M6 and is output to the inverting output. In this case, the gm amplifier 212 serves as an inverting amplifier.

In this manner, the gm amplifier 212 (and the amplifier 211 constituted by gm amplifiers) is capable of changing the signs of the output values in accordance with the values (control values) of the control signals.

With the above-described configuration, the phase shifter 131 combines the I signal and the Q signal in accordance with the control values so as to output a phase-adjusted IQ signal. That is, by combining the I signal and the Q signal, the phase shifter 131 generates a signal equivalent to a signal obtained by rotating the phase of the base IQ signal and supplies the generated signal to the antenna device 134 at the subsequent stage. The above-described first through fourth control values which define how the I signal and the Q signal will be combined are generated by the phase controller 140, which will be discussed later.

The signal mixer 132 shown in FIG. 1 mixes the I signal and the Q signal output from the phase shifter 131 and outputs the resulting IQ signal.

The RF transmitter 133 performs gain adjustment and up-conversion on the IQ signal (hereinafter called the transmission signal) output from the signal mixer 132.

The antenna device 134 radiates the transmission signal up-converted by the RF transmitter 133 around the wireless communication apparatus 100.

The phase controller 140 individually supplies the above-described control values to the phase shifters 131 so as to control the directivity of radio waves of transmission signals to be radiated from the first through N antenna devices $134_1$ through $134_N$. In this case, however, the phase controller 140 adjusts the control values to be supplied to the phase shifters 131 from default values which are set for performing directivity control, thereby correcting transmission signals for quadrature errors (IQ errors).

The phase controller 140 includes a look-up table (LUT) 141, a phase setting unit 142, a control value obtaining unit 143, a phase error correcting unit 144, and an amplitude error correcting unit 145. The phase error correcting unit 144 and the amplitude error correcting unit 145 may be disposed outside the phase controller 140.

The look-up table 141 is a reference table in which the first through fourth control values to be supplied to the phase shifters 131 are described according to the phase θ to be supplied to each antenna device 134. In this case, the values of the first through fourth control signals are those in a case in which transmission signals are not corrected for quadrature errors. That is, the look-up table 141 is a table in which at least the values of cos θ and sin θ are described for each θ.

The phase setting unit 142 sets the value of the phase (hereinafter referred to as the "default phase") θ for each antenna device 134 in accordance with a predetermined pattern of directivity, and outputs the default phase θ which is set for each antenna device 134 to the control value obtaining unit 143. That is, the phase setting unit 142 outputs first through N default phases $θ_1$ through $θ_N$ in accordance with one pattern of directivity.

A certain pattern of directivity is selected from among a plurality of prepared patterns of different directivity directions by, for example, a higher application layer (not shown) included in the wireless communication apparatus 100.

The control value obtaining unit 143 obtains, for each transmission branch 130, control values corresponding to the default phase θ set by the phase setting unit 142 by referring to the look-up table 141, and supplies the obtained control values to the corresponding phase shifter 131. The control values to be supplied to one phase shifter 131 are, for example, the first through fourth control values corresponding to cos θ, −sin θ, sin θ, and cos θ discussed with reference to FIGS. 2 and 3.

The phase error correcting unit 144 changes reference values (indexes) in the look-up table 141 at least for the third and fourth control values which are referred to by the control value obtaining unit 143, thereby correcting transmission signals for phase errors. Details of corrections for phase errors performed by the phase error correcting unit 144 will be discussed later.

The amplitude error correcting unit 145 adjusts at least the first and second control values to be supplied from the control value obtaining unit 143 to the phase shifters 131, thereby correcting transmission signals for amplitude errors. Details of corrections for amplitude errors performed by the amplitude error correcting unit 145 will be discussed later.

The wireless communication apparatus 100 includes a central processing unit (CPU), a storage medium, such as a read only memory (ROM), storing a control program therein, a work memory, such as a random access memory (RAM), and a communication circuit, although these elements are not shown. In this case, functions, such as the signal generator 110, the phase controller 140, and a higher application layer, are implemented as a result of the CPU executing the control program.

In the wireless communication apparatus 100 configured as described above, the phase shifter 131 that perform phase rotation for an IQ signal is disposed for each antenna device 134, and also, control values to be input into each phase shifter 131 can be adjusted. This enables the wireless communication apparatus 100, not only to perform directivity communication using IQ signals, but also to correct IQ signals for quadrature errors by performing simple processing such as by adjusting control values to be input into the phase shifters 131.

(Corrections for Phase Errors and Amplitude Errors)

Details of phase error corrections and amplitude error corrections (quadrature error corrections) performed by the phase controller 140 will be discussed below.

Figure 6:
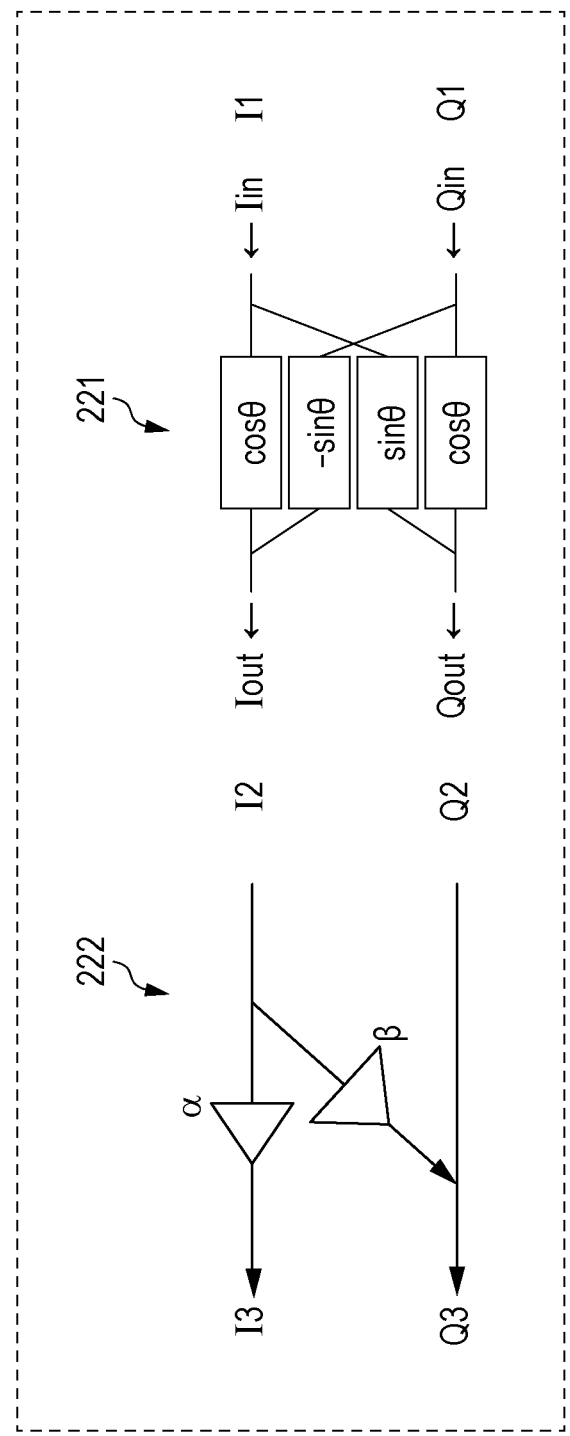
FIG. 6 conceptually illustrates an example of the state in which quadrature errors are corrected in the first embodiment.
Figure 7:
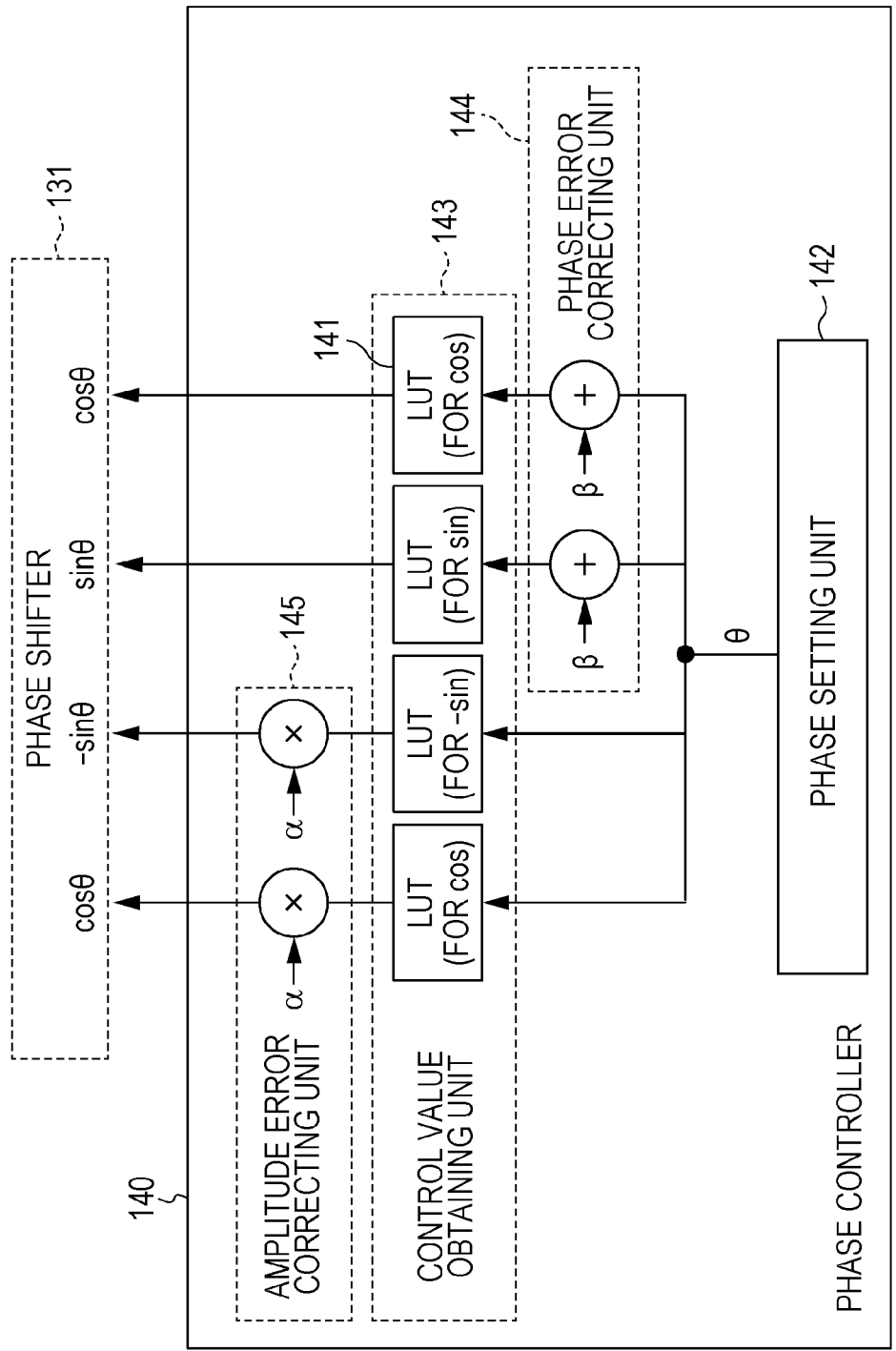
FIG. 7 illustrates an example of the detailed configuration of a phase controller in the first embodiment.

FIG. 6 is a conceptual diagram illustrating an example of the state in which quadrature errors are corrected. FIG. 7 illustrates an example of the detailed configuration of the phase controller 140 in association with operations performed by the individual elements of the phase controller 140.

In FIG. 6, I1 and Q1 represent the values of an I signal and a Q signal input into a certain phase shifter 131 (hereinafter referred to as the "input values I1 and Q1"). I2 and Q2 represent the values of the I signal and the Q signal which have not been corrected for quadrature errors and output from the phase shifter 131 (hereinafter referred to as the "intermediate values I2 and Q2"). I3 and Q3 represent the values of the I signal and the Q signal which have been corrected for quadrature errors and output from the phase shifter 131 (hereinafter referred to as the "output values I3 and Q3").

Processing for obtaining the output values I3 and Q3 from the input values I1 and Q1 can be considered as being separated into two operations, for example, a phase rotation operation 221 for rotating the phase of the input values I1 and Q1 based on the default phase θ and a quadrature error correcting operation 222 for correcting the intermediate values I2 and Q2 for quadrature errors obtained by the phase rotation operation 221.

The phase rotation operation 221 is implemented by supplying values corresponding to cos θ, −sin θ, and cos θ as the first through fourth control values to the phase shifter 131 configured as discussed with reference to FIGS. 2 and 3.

In the quadrature error correcting operation 222, the value obtained by multiplying the I signal by a correction value α is output as a new I signal, while the I signal is first multiplied by a correction value β, and then, the Q signal is added to this multiplication value and the resulting value is output as a new Q signal. In this case, the amplitude errors of the IQ signal are corrected for by the correction value α, while the phase errors of the IQ signal are corrected for by the correction value β.

The relationships between the input values I1 and Q1 and the intermediate values I2 and Q2 (phase rotation operation 221) may be expressed by equations (1). Equations (1) represent the rotation operation of the related art.

$$I2=\cos θ·I1−\sin θ·Q1$$

$$Q2=\sin θ·I1+\cos θ·Q1 \quad (1)$$

The relationships between the intermediate values I2 and Q2 and the output values I3 and Q3 (quadrature error correcting operation 222) may be expressed by equations (2).

$$I3=α·I2$$

$$Q3=β·I2+Q2 \quad (2)$$

If the output values I3 and Q3 are expressed by using the input values I1 and Q1 by rearranging equations (1) and (2), equations (3) are established.

$$I3=α·\cos θ·I1−α·\sin θ·Q1$$

$$Q3=(β·\cos θ+\sin θ)·I1+(\cos θ−β·\sin θ)·Q1 \quad (3)$$

The correction value β necessary for correcting phase errors is generally a value close to zero, and thus, it may be approximated as β=sin β and cos β=1. Accordingly, equations (3) may be modified into equations (4).

$$I3=α·\cos θ·I1−α·\sin θ·Q1$$

$$Q3=\sin(θ+β)·I1+\cos(θ+β)·Q1 \quad (4)$$

Equations (4) are different from equations (1) merely in that, concerning the I signal, the I signal is uniformly multiplied by the correction value α and, concerning the Q signal, the default phase θ is replaced by the value (θ+β) obtained by adding the correction value β to θ.

That is, it is possible to correct the IQ signal for amplitude errors in the phase shifter 131 by multiplying each of the first control value (cos θ) and the second control value (−sin θ) obtained from the look-up table 141 based on the default phase θ by the correction value α. It is also possible to correct the IQ signal for phase errors in the phase shifter 131 by changing the reference values (indexes) of the look-up table 141 for obtaining the third control value (sin θ) and the fourth control value (cos θ) from the default phase θ to θ'=θ+β.

Accordingly, as shown in FIG. 7, concerning the third and fourth control values, the phase error correcting unit 144 adds the correction value β to the default phase θ used by the control value obtaining unit 143 as the reference value (index value) in the look-up table 141. As a result, the phase controller 140 outputs sin(θ+β) and cos(θ+β) as the third and fourth control values, respectively.

As shown in FIG. 7, concerning the first and second control values, the amplitude error correcting unit 145 multiplies the values cos θ and −sin θ obtained by the control value obtaining unit 143 from the look-up table 141 by the correction value α. As a result, the phase controller 140 outputs α·cos θ and −α·sin θ as the first and second control values, respectively.

That is, if the phase controller 140 supplies the following control values to a certain phase shifter 131 in a case in which there is no quadrature errors, first control value=cos θ
second control value=−sin θ
third control value=sin θ
fourth control value=cos θ the phase controller 140 supplies the following control values to the same phase shifter 131 in the case of the occurrence of amplitude errors that will be corrected for by the correction value α and phase errors that will be corrected for by the correction value β.

first control value=α·cos θ
second control value=−α·sin θ
third control value=sin(θ+β)
fourth control value=cos(θ+β)

The correction values α and β may be determined as follows. A table in which the value of amplitude errors and the correction value α are associated with each other and a table in which the value of phase errors and the correction value β are associated with each other are prepared. Then, the correction values α and β are determined according to the values of the detected amplitude errors and phase errors by referring to these tables. Alternatively, in order to optimize the correction values α and β, provisional values of the correction values α and β are sequentially determined while amplitude errors and phase errors are being detected. Then, the determined correction values α and β are sequentially set in the amplitude error correcting unit 145 and the phase error correcting unit 144, respectively.

With this configuration, the phase controller 140 realizes processing expressed by equations (4) which reflect both of the phase rotation operation 221 and the quadrature error correcting operation 222 by using each phase shifter 131.

Usually, processing for generating control values to be supplied to the phase shifters 131 is executed by digital signal processing. This enables the wireless communication apparatus 100, not only to easily realize the multiplication of the correction value α and changing of the reference values in the look-up table 141, but also to correct for quadrature errors with high precision, substantially without increasing the circuit scale.

The phase controller 140 may use the look-up table 141 in which the value of cos θ is associated with the phase θ also as a look-up table for outputting the first and fourth control values.

The phase controller 140 may use the look-up table 141 in which the value of sine is associated with the phase θ also as a look-up table for outputting the second and third control values. In this case, the control value obtaining unit 143 inverts the sign of the value obtained from the look-up table 141 and outputs the inverted value as the third control value.

The phase controller 140 may use the look-up table 141 in which the value of cos θ or sin Θ is associated with the phase θ also as a look-up table for outputting the first through fourth control values. In this case, the control value obtaining unit 143 obtains two control values from the look-up table 141 by shifting the phase θ by 2/π and inverts the signs of the obtained two control values so as to obtain the first through fourth control values.

(Operation of Wireless Communication Apparatus)

A flow of the operation of the wireless communication apparatus 100 will be described briefly.

In the wireless communication apparatus 100, an IQ signal is generated in the signal generator 110 and is converted into an analog IQ signal in the D/A converter 120, and is then input into each of the first through N transmission branches $130_1$ through $130_N$. Then, for each antenna device 134, the wireless communication apparatus 100 combines the I signal and the Q signal with each other in each of the first through N phase shifters $131_1$ through $131_N$ by using the phase controller 140 so as to generate transmission signals equivalent to signals obtained by rotating the phase of the base IQ signal. As a result, the wireless communication apparatus 100 radiates transmission signals in which the directivity of radio waves is controlled from the first through N antenna devices $134_1$ through $134_N$. Meanwhile, the phase controller 140 corrects the transmission signals for quadrature errors by adjusting the control values which define how the I signal and the Q signal will be combined.

(Advantages of First Embodiment)

As described above, the wireless communication apparatus 100 according to the first embodiment includes the plurality of antenna devices 134, the signal generator 100, the phase shifter 131, the phase controller 140, and the phase error correcting unit 144 and the amplitude error correcting unit 145 (quadrature error correcting unit). The phase generator 100 generates an IQ signal constituted by an I signal and a Q signal. The phase shifter 131 is provided for each of the plurality of antenna devices 134. The phase shifter 131 generates a transmission signal equivalent to a signal obtained by rotating the phase of the IQ signal by combining the I signal and the Q signal with each other, and supplies the transmission signal to the corresponding antenna device 134. The phase controller 140 controls the directivity of radio waves of the transmission signals radiated from the plurality of antenna devices 134 by individually supplying control values which define how the I signal and the Q signal will be combined to the phase shifters 131. The phase error correcting unit 144 and the amplitude error correcting unit 145 correct the transmission signals for quadrature errors by adjusting the above-described control values.

That is, in the wireless communication apparatus 100 according to the first embodiment, values determined by considering quadrature errors are used as control values to be set in the phase shifter 131 provided in each transmission branch 130 in a phased array system.

With this configuration, in addition to phase control for beamforming, the wireless communication apparatus 100 according to the first embodiment is able to make corrections for IQ errors for each transmission branch 130 by using a simple technique such as adjusting of control values.

That is, the wireless communication apparatus 100 according to the first embodiment is able to perform directivity communication by using IQ signals corrected for quadrature errors, substantially without increasing the circuit scale.

If the above-described related art is applied to a phased array system, an analog circuit for correcting for quadrature errors is provided for each antenna device, as discussed above. The circuit scale of an analog circuit is usually larger than that of a digital circuit, and the correction characteristics of the analog circuit are more likely to deteriorate due to the influence of process variations and temperature change. Thus, the wireless communication apparatus 100 according to the first embodiment is able to perform higher-precision quadrature error corrections than the related art.

An analog IQ correcting circuit that performs the quadrature error correcting operation 222 shown in FIG. 6 may be provided at the subsequent stage of each phase shifter 131. However, the configuration in which an analog IQ correcting circuit is disposed in each transmission branch 130 increases the circuit scale and also makes it difficult to perform high-precision quadrature error corrections. Thus, compared with this configuration, the wireless communication apparatus 100 according to the first embodiment is able to perform higher-precision quadrature error corrections with the reduced circuit scale.

The D/A converter 120 may be disposed in each transmission branch 130 and an IQ correcting circuit that performs the quadrature error correcting operation 222 shown in FIG. 6 may be provided at the previous stage of each D/A converter 120. In this case, it is possible to perform higher-precision quadrature error corrections than the use of an analog IQ correcting circuit. On the other hand, however, the configuration in which the D/A converter 120 and the digital IQ correcting circuit are disposed in each transmission branch 130 significantly increases the circuit scale. Thus, compared with this configuration, in the wireless communication apparatus 100 according to the first embodiment, the circuit scale can be significantly reduced.

[Second Embodiment]

In a second embodiment of the present disclosure, the function of the amplitude error correcting unit 145 of the first embodiment is implemented by an amplitude error correcting circuit provided in each transmission branch.

(Configuration of Wireless Communication Apparatus)

The configuration of a wireless communication apparatus of the second embodiment will first be discussed below.

Figure 8:
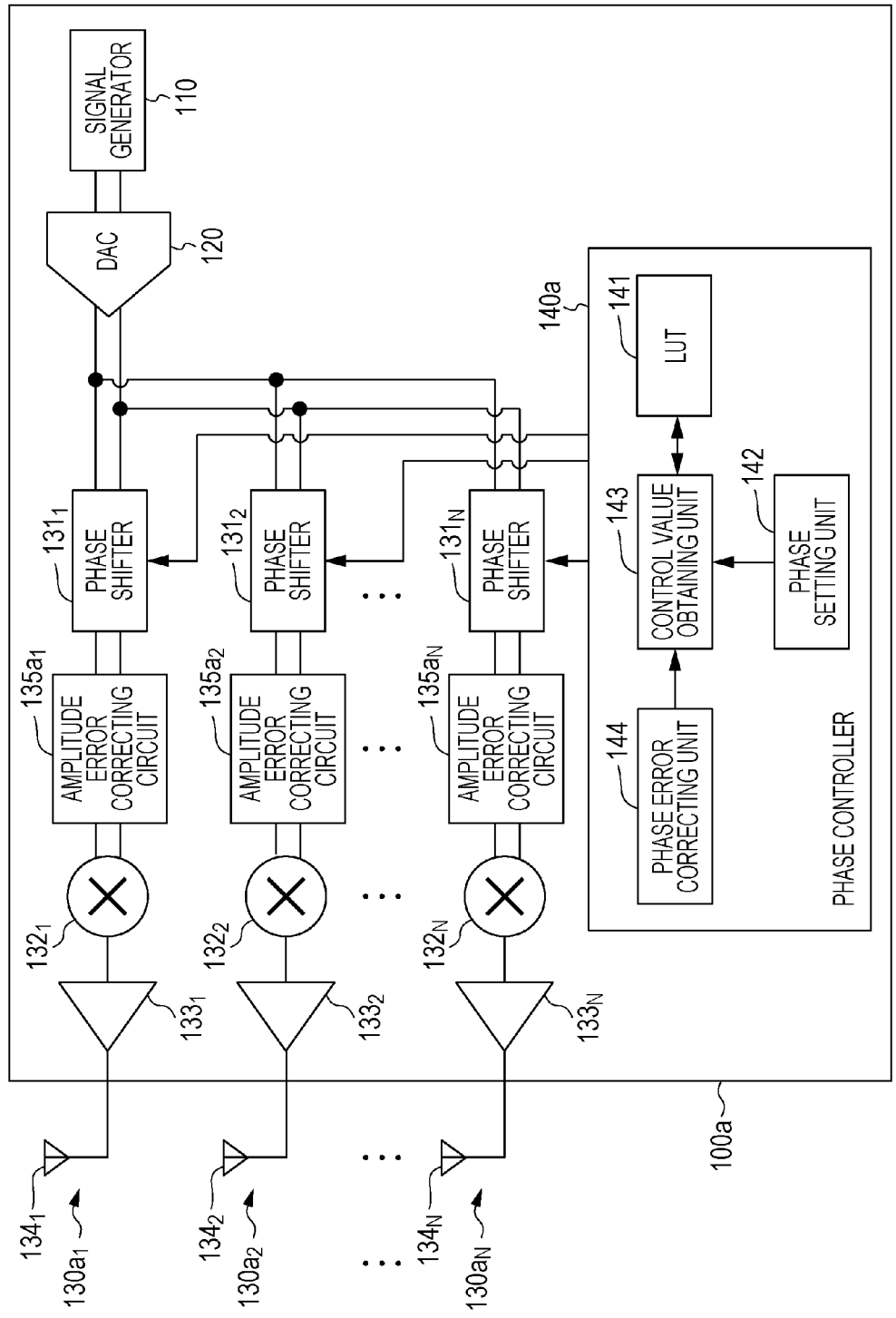
FIG. 8 illustrates an example of the configuration of a wireless communication apparatus according to a second embodiment of the present disclosure.

FIG. 8 is a block diagram illustrating an example of the configuration of a wireless communication apparatus 100a according to the second embodiment. FIG. 8 corresponds to FIG. 1 illustrating the first embodiment. In FIG. 8, the same elements as those shown in FIG. 1 are designated by like reference numerals, and an explanation thereof will thus be omitted.

As shown in FIG. 8, the wireless communication apparatus 100a includes a signal generator 110, a D/A converter 120, first through N transmission branches $130a_1$ through $130a_N$, and a phase controller 140a.

Each of the transmission branches 130a includes a phase shifter 131, a signal mixer 132, an RF transmitter 133, and an antenna device 134. In the second embodiment, the transmission branch 130a also includes an amplitude error correcting circuit 135a interposed between the phase shifter 131 and the signal mixer 132. The phase controller 140a does not have the amplitude error correcting unit 145 provided in the phase controller 140 of the first embodiment.

That is, in the second embodiment, the amplitude error correcting function implemented by the amplitude error correcting unit 145 of the phase controller 140 of the first embodiment is implemented by the amplitude error correcting unit 135a disposed in each transmission branch 130a. The phase controller 140a without an amplitude error correcting function corrects only for phase errors by using each phase shifter 131.

The amplitude error correcting circuit 135a provides different degrees of amplification to the I signal and the Q signal. That is, the amplitude error correcting circuit 135a at least includes a gain amplifier for adjusting the amplitude of at least one of the I signal and the Q signal. For example, the amplitude error correcting circuit 135a includes a circuit for amplifying the I signal by varying the gain and a circuit for amplifying the Q signal by varying the gain.

(Corrections for Phase Errors and Amplitude Errors)

Details of phase error corrections and amplitude error corrections performed by the phase controller 140a will be discussed below.

Figure 9:
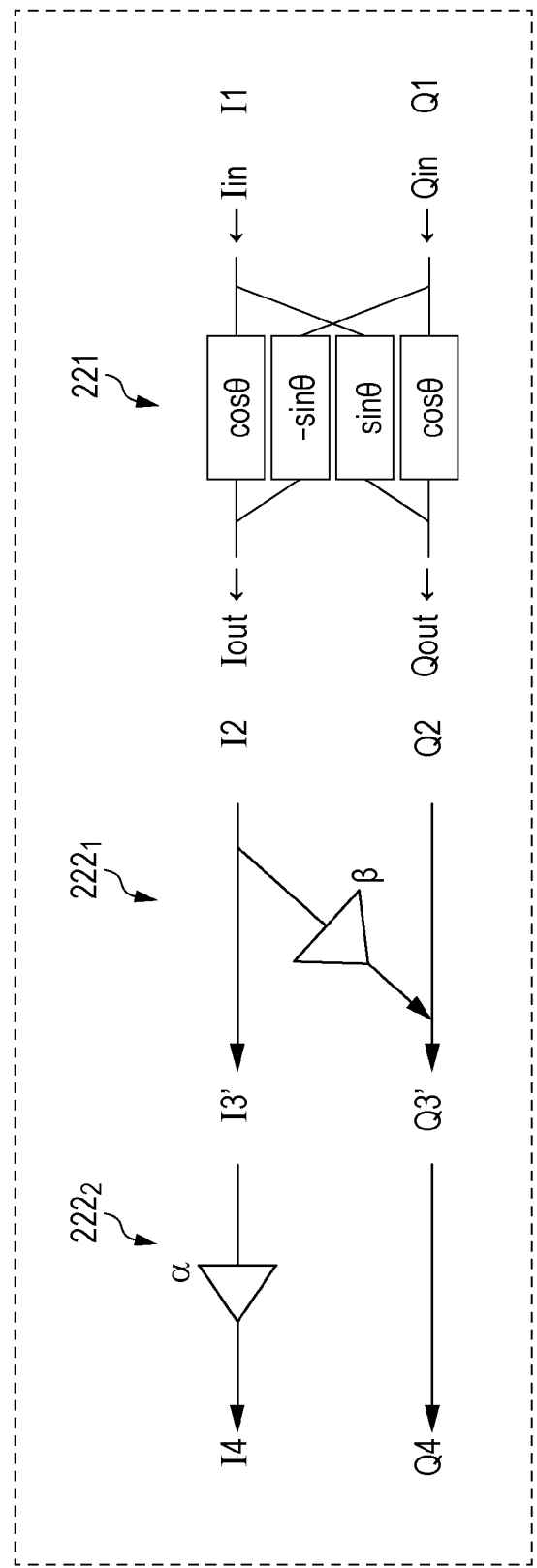
FIG. 9 conceptually illustrates an example of the state in which quadrature errors are corrected in the second embodiment.
Figure 10:
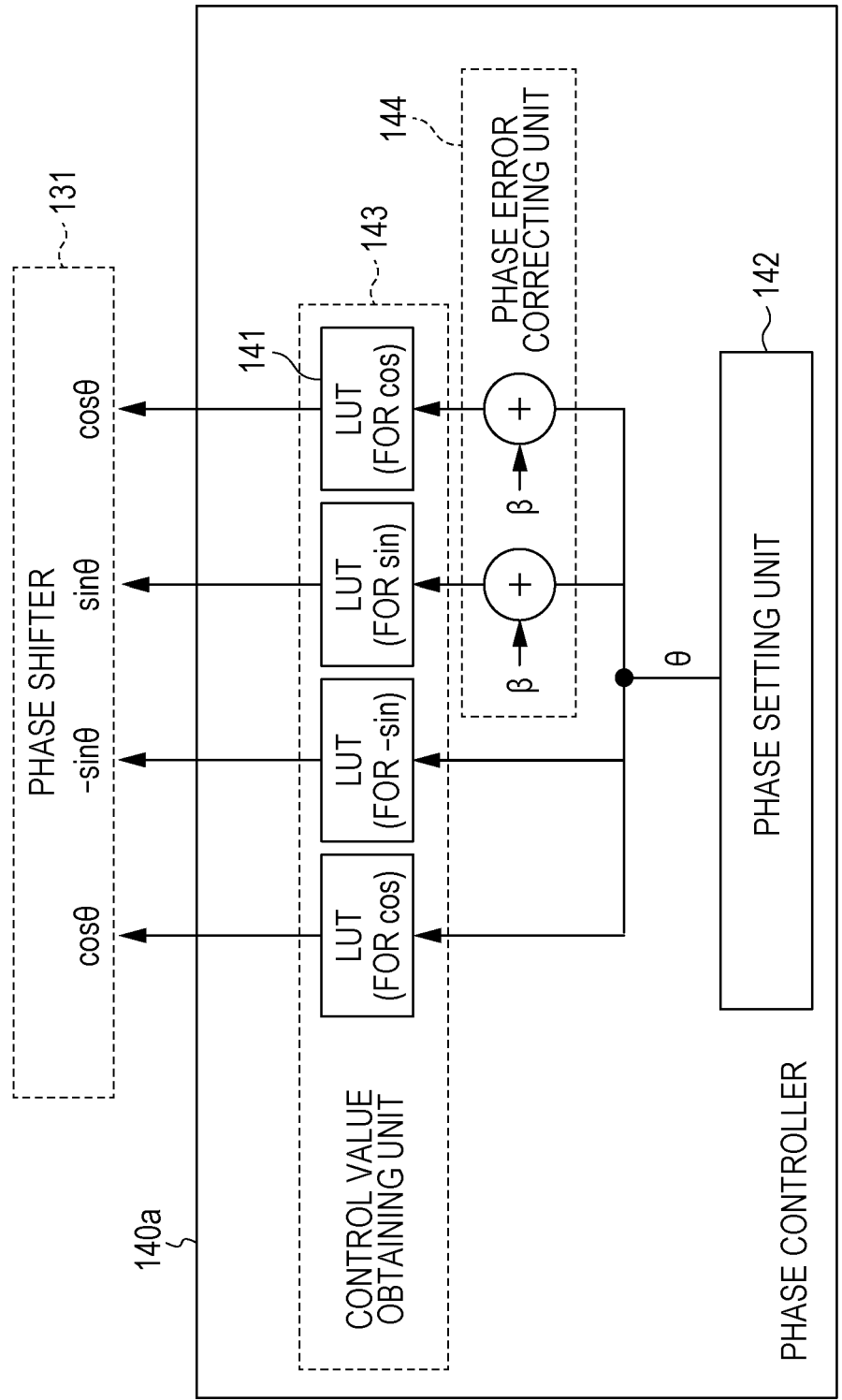
FIG. 10 illustrates an example of the detailed configuration of a phase controller in the second embodiment.

FIG. 9 is a conceptual diagram illustrating an example of the state in which quadrature errors are corrected in the second embodiment. FIG. 9 corresponds to FIG. 6 illustrating the first embodiment. FIG. 10 illustrates an example of the detailed configuration of the phase controller 140a in association with operations performed by the individual elements of the phase controller 140a. FIG. 10 corresponds to FIG. 7 illustrating the first embodiment. The same elements as those shown in FIGS. 6 and 7 are designated by like reference numerals and signs, and an explanation thereof will thus be omitted.

In FIG. 9, I3' and Q3' (intermediate values) represent the values of the I signal and the Q signal which have been corrected for phase errors and output from the phase shifter 131. I4 and Q4 (output values) represent the values of the I signal and the Q signal which have been corrected for amplitude errors and output from the amplitude error correcting circuit 135a.

The relationships between the input values I1 and Q1 and the intermediate values I2 and Q2 (phase rotation operation $221$) are expressed by equations (1), as in the first embodiment.

Processing for obtaining the output values I4 and Q4 from the intermediate values I2 and Q2 can be considered as being separated into two operations, for example, a phase error correcting operation $222_1$ performed on the intermediate values I2 and Q2 and an amplitude error correcting operation $222_2$ performed on the intermediate values I3' and Q3' obtained by performing the phase error correcting operation $222_1$.

The relationships between the intermediate values I2 and Q2 and the intermediate values I3' and Q3' (phase error correcting operation $222_1$) may be expressed by equations (5).

$$I3'=I2$$

$$Q3'=\beta \cdot I2+Q2 \qquad (5)$$

If the intermediate values I3' and Q3' are expressed by using the input values I1 and Q1 by rearranging equations (1) and (5), equations (6) are established.

$$I3'=\cos\theta \cdot I1 - \sin\theta \cdot Q1$$

$$Q3'=(\beta \cdot \cos\theta + \sin\theta) \cdot I1 + (\cos\theta - \beta \cdot \sin\theta) \cdot Q1 \qquad (6)$$

As in the first embodiment, if the correction value β is approximated as β=sin β and cos β=1, equations (6) may be modified into equations (7).

$$I3'=\cos\theta \cdot I1 - \sin\theta \cdot Q1$$

$$Q3'=\sin(\theta+\beta) \cdot I1 + \cos(\theta+\beta) \cdot Q1 \qquad (7)$$

As a result of comparing equations (7) with equations (1), it is seen that, concerning the I signal, there is no difference, and concerning the Q signal, the difference between equations (1) and (7) is merely that the default phase e is replaced by the value (θ+β) obtained by adding the correction value β to θ.

That is, if the phase controller 140a supplies the following control values to a certain phase shifter 131 in a case in which there is no quadrature errors, first control value=cos θ
second control value=−sin θ
third control value=sin θ
fourth control value=cos θ the phase controller 140a supplies the following control values to the same phase shifter 131 in the case of the occurrence of amplitude errors that will be corrected for by the correction value α and phase errors that will be corrected for by the correction value β.

first control value=cos θ
second control value=sin θ
third control value=sin(θ+β)
fourth control value=cos(θ+β)

Corrections for amplitude errors that will be corrected for by the correction value α are performed by the amplitude error correcting circuit 135a.

The relationships between the intermediate values I3' and Q' and the output values I4 and Q4 (amplitude error correcting operation $222_2$) may be expressed by equations (8).

$$I4=\alpha \cdot I3'$$

$$Q4=Q3' \qquad (8)$$

If the output values I4 and Q4 are expressed by using the input values I1 and Q1 by rearranging equations (7) and (8), equations (9) are established.

$$I4=\alpha \cdot \cos\theta \cdot I1 - \alpha \cdot \sin\theta \cdot Q1$$

$$Q4=\sin(\theta+\beta) \cdot I1 + \cos(\theta+\beta) \cdot Q1 \qquad (9)$$

The output values I4 and Q4 from the amplitude error correcting circuit 135a are handled similarly to the output values I3 and Q3 from the phase shifter 131 in the first embodiment and are input into the signal mixer 132. Accordingly, equations (9) are equivalent to equations (4) in the first embodiment.

Thus, although the phase controller 140a does not include the amplitude error correcting unit 145 as shown in FIG. 10, the amplitude error correcting circuit 135a provided in each transmission branch 130a multiplies the I signal by the correction value α (or divides the Q signal by the correction value α) so as to perform quadrature error corrections similar to those in the first embodiment. That is, the amplitude error correcting circuit 135a adjusts the amplitude of at least one of the I signal and the Q signal, thereby making it possible to perform amplitude error corrections for a transmission signal to be radiated from the corresponding antenna device 134.

(Operation of Wireless Communication Apparatus)

A flow of the operation of the wireless communication apparatus 100*a* will be described briefly. The operation of the wireless communication apparatus 100*a* is similar to that of the wireless communication apparatus 100 of the first embodiment. However, among quadrature errors to be corrected for, only phase errors are corrected for in the phase controller 140*a* by adjusting control values to be supplied to the phase shifters 131, and amplitude errors are corrected for, separately from phase errors, from signals output from the phase shifters 131 (transmission signals in which the directivity of radio waves is controlled).

(Advantages of Second Embodiment)

As described above, the wireless communication apparatus 100*a* according to the second embodiment corrects an IQ signal for amplitude errors by using the amplitude error correcting circuit 135*a* provided in each transmission branch 130*a*, instead of by adjusting control values to be supplied to the phase shifter 131.

It is possible to form the circuit scale of the amplitude error correcting circuit 135*a* smaller than that of the IQ correcting circuit of the related art. Thus, compared with the related art, the wireless communication apparatus 100*a* according to the second embodiment is able to perform directivity communication by using IQ signals corrected for quadrature errors with a reduced circuit scale.

In the second embodiment, the multiplication of the correction value α for correcting for amplitude errors is performed, not on control values to be supplied to the phase shifter 131, but on an IQ signal output from the phase shifter 131. With this configuration, the wireless communication apparatus 100*a* is advantageous over the wireless communication apparatus 100 of the first embodiment in that it is able to correct for amplitude errors while avoiding the influence of, for example, any change made to the phase shifter 131 or a decrease in the phase control precision.

This will be explained more specifically. If the phase θ=0° is applied to an IQ signal for a certain transmission branch 130*a*, the value of cos θ corresponding to the first and fourth control values is 1.0.

If, for example, a combination of a sign one bit and the absolute value of five bits is a control value to be supplied to the phase shifter 131, 1·½+1·¼+1·⅛+1·¹⁄₁₆+1·¹⁄₃₂=31/3231/32 is considered as 1.0. That is, the control value obtaining unit 143 multiplies a control value to be supplied to the phase shifter 131 by 31/32, and the value obtained by performing bit conversion of a power of two on the resulting multiplication value is set to be the absolute value of five bits. That is, the first and fourth control values to be input into the phase shifter 131 when θ=0° is "0_11111".

In this case, if amplitude corrections are performed by using the correction value α=1.2, the first and fourth control values to be input into the phase shifter 131 are α·cos θ=1.2, that is, 1.2×31/32≈37/32. However, if the phase shifter 131 has only five-stage amplifiers 211 corresponding to ½, ¼, ⅛, ¹⁄₁₆, and ¹⁄₃₂ (see FIG. 4), it is unable to generate a current of 37/32 and is thus unable to set α>1.

In this case, certain measures may be taken, for example, six-stage amplifiers 211 including an amplifier 211 corresponding to 1 may be prepared, in which case, however, an extra amplifier 211 has to be added to the phase shifter 131. Alternatively, the overall scale may be uniformly reduced to half while the five-stage amplifiers 211 are maintained, in which case, however, the bit precision for phase control is decreased.

In the wireless communication apparatus 100*a* according to the second embodiment, the multiplication of the correction value α is not performed on the control value to be supplied to the phase shifter 131. Thus, amplitude error corrections can be performed while avoiding the influence of the addition of an amplifier 211 to the phase shifter 131 or a decrease in the phase control precision.

If a wireless communication apparatus includes a circuit for uniformly amplifying the IQ signal by varying the gain, this circuit may simply be modified so that it can perform amplification control separately for the I signal and the Q signal. Then, a function equivalent to the function of the amplitude error correcting circuit 135*a* can be added.

[Third Embodiment]

In a third embodiment, quadrature error corrections discussed in the first embodiment are performed in a receiving system of a wireless communication apparatus that receives a radio signal by using an array antenna including N antenna devices.

Figure 11:
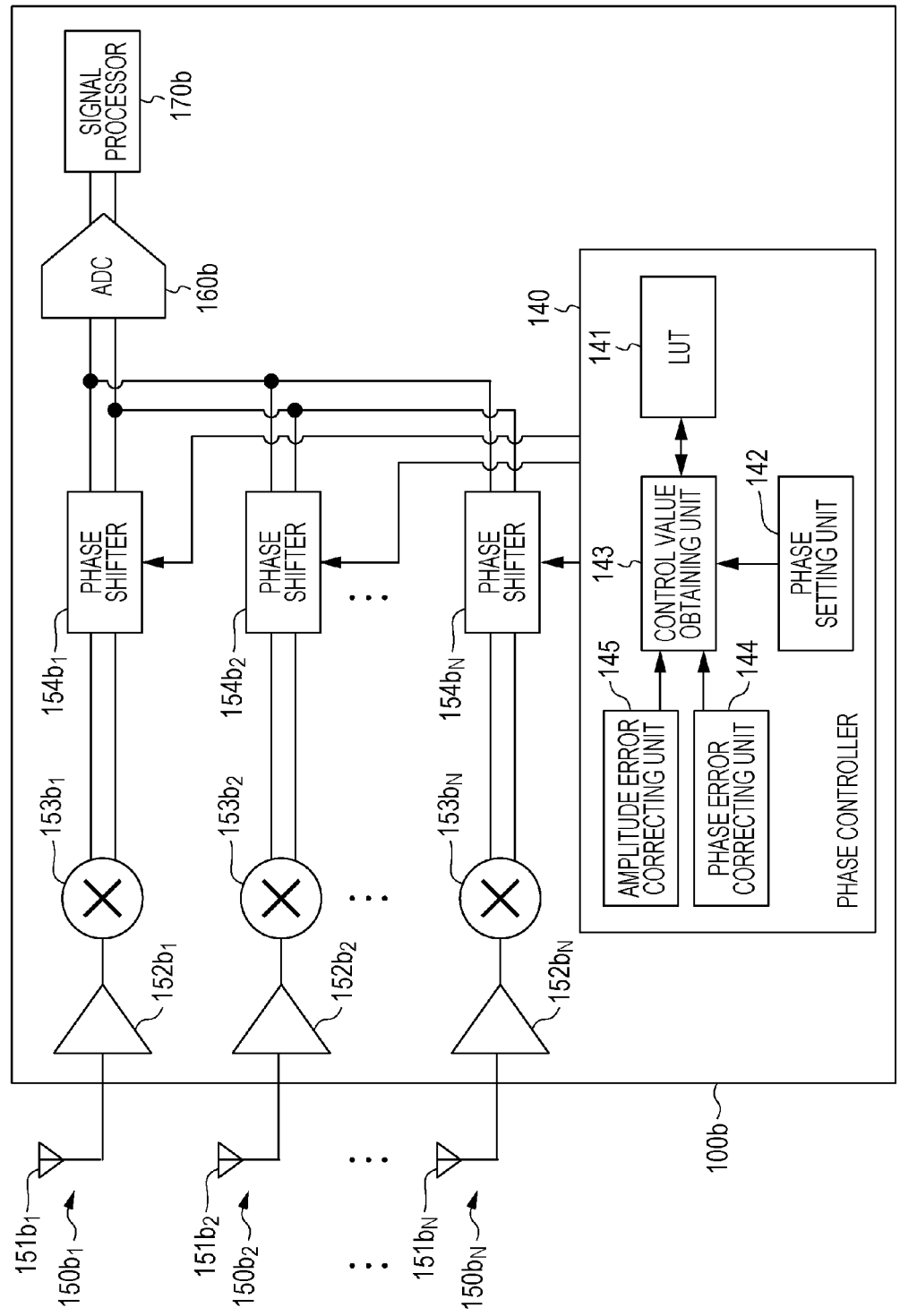
FIG. 11 illustrates an example of the configuration of a wireless communication apparatus according to a third embodiment of the present disclosure.

FIG. 11 is a block diagram illustrating an example of the configuration of a wireless communication apparatus 100*b* according to the third embodiment. FIG. 11 corresponds to FIG. 1 illustrating the first embodiment. In FIG. 11, the same elements as those shown in FIG. 1 are designated by like reference numerals, and an explanation thereof will thus be omitted.

As shown in FIG. 11, the wireless communication apparatus 100*b* includes first through N reception branches 150*b*$_1$ through 150*b*$_N$, a phase controller 140, an analog-to-digital (A/D) (ADC) converter 160*b*, and a signal processor 170*b*.

Each reception branch 150*b* includes an antenna device 151*b*, an RF receiver 152*b*, a signal separator 153*b*, and a phase shifter 154*b*.

The antenna device 151*b* receives a radio signal.

The RF receiver 152*b* performs gain adjustment and down-conversion on the radio signal received by the antenna device 151*b*.

The signal separator 153*b* extracts an analog IQ signal from the radio signal down-converted by the RF receiver 152*b* and outputs the analog IQ signal in a state in which the I signal and Q signal are separated from each other.

On the basis of control values supplied from the phase controller 140, the phase shifters 154*b* of the respective transmission branches 150*b* provide different phases to the IQ signal output from the signal separator 153*b*. The configuration and operation of the phase shifter 154*b* are similar to those of the phase shifter 131 of the first embodiment. However, the phase shifter 154*b* performs phase rotation for the IQ signal in order to control the reception directivity in the array antenna.

The A/D converter 160*b* combines the IQ signals output from the first through N phase shifters 154*b*$_1$ through 154*b*$_N$ and performs A/D conversion on the combined IQ signal so as to generate a digital IQ signal.

The signal processor 170*b* extracts information from the digital IQ signal output from the A/D converter 160*b*, and supplies the extracted information to, for example, a higher application layer.

In the wireless communication apparatus 100*b* configured as described above, in a reception system that receives an IQ signal by controlling the directivity, quadrature error corrections can be performed on the IQ signal substantially without increasing the circuit scale.

[Fourth Embodiment]

In a fourth embodiment of the present disclosure, the function of the amplitude error correcting unit 145 of the third embodiment is implemented by an amplitude error correcting circuit provided in each reception branch, such as that discussed in the second embodiment.

Figure 12:
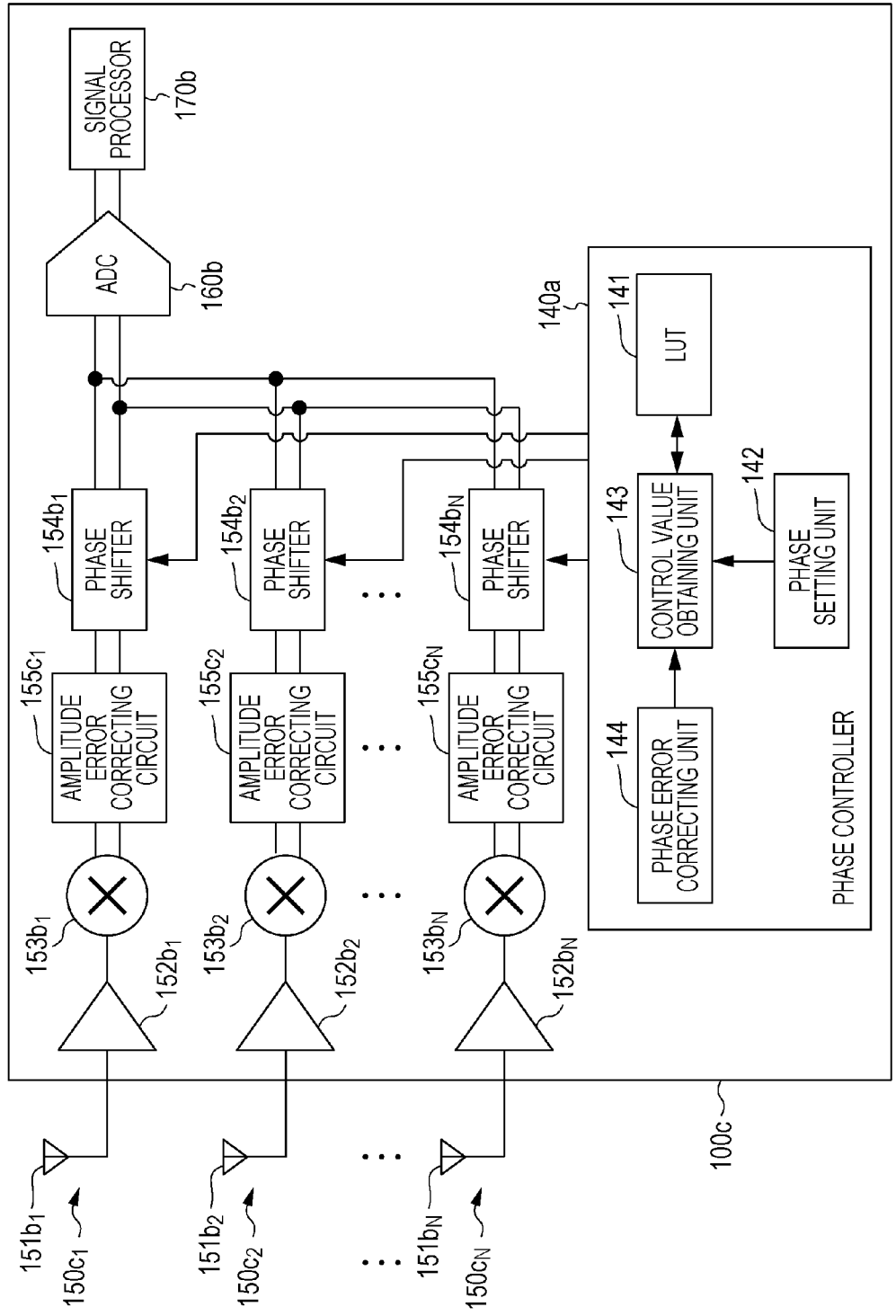
FIG. 12 illustrates an example of the configuration of a wireless communication apparatus according to a fourth embodiment of the present disclosure.

FIG. 12 is a block diagram illustrating an example of the configuration of a wireless communication apparatus 100c according to the fourth embodiment. FIG. 12 corresponds to FIG. 8 illustrating the second embodiment and FIG. 11 illustrating the third embodiment. In FIG. 12, the same elements as those shown in FIGS. 8 and 11 are designated by like reference numerals, and an explanation thereof will thus be omitted.

As shown in FIG. 12, the wireless communication apparatus 100c includes first through N reception branches $150c_1$ through $150c_N$, a phase controller 140a, an A/D converter 160b, and a signal processor 170b.

Each of the reception branches 150c includes an antenna device 151b, an RF receiver 152b, a signal separator 153b, and a phase shifter 154b. In the fourth embodiment, the reception branch 150c also includes an amplitude error correcting circuit 155c interposed between the signal separator 153b and the phase shifter 154b.

The amplitude error correcting circuit 155c provides different degrees of amplification to the I signal and the Q signal. The configuration and operation of the amplitude error correcting circuit 155c are similar to those of the amplitude error correcting circuit 135a of the second embodiment.

In the wireless communication apparatus 100c configured as described above, in a reception system that receives IQ signals by controlling the directivity, quadrature error corrections can be performed on IQ signals. In particular, quadrature error corrections can be performed substantially without increasing the circuit scale and by avoiding the influence of, for example, any change made to the phase shifter 154b or a decrease in the phase control precision.

[Modified Examples of the Embodiments]

The configurations of the wireless communication apparatuses of the above-described first through fourth embodiments may be modified.

For example, the phase controller may store in advance a look-up table prepared for each correction value β in which control values that reflect the correction value β are described, and may change the look-up table for reference according to the correction value β.

In the above-described embodiments, the I signal and the Q signal may be read as (replaced by) the Q signal and the I signal, respectively, and may be applied to the wireless communication apparatus.

The wireless communication apparatus may not necessarily include an amplitude error correcting unit or an amplitude error correcting circuit. That is, the wireless communication apparatus may perform only phase error corrections among quadrature error corrections.

Conversely, the wireless communication apparatus may not necessarily include a phase error correcting unit. That is, the wireless communication apparatus may perform only amplitude error corrections among quadrature error corrections.

[Conclusions of the Present Disclosure]

A wireless communication apparatus according to an aspect of the present disclosure includes a plurality of antenna devices, signal generating circuitry, a plurality of phase shifting circuitry, phase controlling circuitry, and quadrature error correcting circuitry. The signal generating circuitry, in operation, generates an IQ signal having an I signal and a Q signal. The plurality of phase shifting circuitry provided for each of the plurality of antenna devices, in operation, generates a plurality of combination signals by combining the I signal and the Q signal based on a predetermined combining scheme. The phase controlling circuitry, in operation, controls the predetermined combining scheme in each of the plurality of phase shifting circuitry. The quadrature error correcting circuitry, in operation, corrects at least one of amplitude combining scheme and phase combining scheme of the predetermined combining scheme in a correction of the predetermined combining scheme.

In the wireless communication apparatus, the combining scheme may include rotate calculations for the IQ signal in a complex plane.

In the wireless communication apparatus, the plurality of phase shifting circuitry may generate a new I signal of the combination signal by adding the I signal multiplied a first control value and the Q signal multiplied a second control value, and may generate a new Q signal of the combination signal by adding the I signal multiplied a third control value and the Q signal multiplied a fourth control value. The phase controlling circuitry individually may supply the first through fourth control values to the phase shifter.

In the wireless communication apparatus, the phase controlling circuitry may include a reference table that contains the first through fourth control values to be supplied to the phase shifting circuitry, the first through fourth values being provided at each pattern of directivity of the plurality of antenna devices. Phase setting circuitry, in operation, may set a value of the phase for each of the plurality of antenna devices in accordance with a predetermined pattern of directivity. Control value obtaining circuitry, in operation, may obtain the first through fourth control values corresponding to the set value of the phase by referring to the reference table and supplies the obtained first through fourth control values to the plurality of phase shifting circuitry. The quadrature error correcting circuitry may include phase error correcting circuitry which, in operation, may modify the obtained third and fourth control values, the modified third and fourth control values being supplied to each of the plurality of phase shifting circuitry.

In the wireless communication apparatus, the quadrature error correcting circuitry may further include amplitude error correcting circuitry which, in operation, modifies the obtained first and second control values, the modified first and second control values being supplied to each of the phase shifting circuitry.

In the wireless communication apparatus, the quadrature error correcting circuitry may further include amplitude error correcting circuitry, provided for each of the plurality of antenna devices which, in operation corrects the amplitude of at least one of the I signal and the Q signal of the combination signal.

A wireless communication method according to an aspect of the present disclosure is a wireless communication method using a plurality of antenna devices. The wireless communication method includes: generating an IQ signal having an I signal and a Q signal; generating a plurality of combination signals by combining the I signal and the Q signal based on a predetermined combining scheme by using a plurality of phase shifting circuitry; controlling the predetermined combining scheme in each of the plurality of phase shifting circuitry; and correcting at least one of amplitude combining scheme and phase combining scheme of the predetermined combining scheme in a correction of the predetermined combining scheme.

Various embodiments have been described above with reference to the drawings, but the present disclosure is not limited to these examples. It is clear that a person skilled in the art can arrive at various changes or modifications within the scope described in the claims, and it is understood that these changes or modifications are also encompassed within the technical scope of the present disclosure. Furthermore, the constituent elements in the embodiments may be combined in any ways as long as the combination is not deviated from the purpose of the present disclosure.

In the embodiment above, a case where the present disclosure is realized by using hardware has been described as an example. However, the present disclosure may be realized by software in combination with hardware.

The functional blocks used for description of the embodiment are typically realized as an LSI which is an integrated circuit having an input terminal and an output terminal. These functional blocks may be realized as individual chips or some or all of the functional blocks may be realized as a single chip. The term "LSI" is used, but the term "IC", "system LSI", "super LSI", or "ultra LSI" may be used depending on the degree of integration.

Furthermore, means to achieve integration is not limited to an LSI and may be a special circuit or a general-purpose processor. An FPGA (Field Programmable Gate Array) that can be programmed after production of an LSI or a reconfigurable processor in which connection or setting of circuit cells inside an LSI can be reconfigured can be also used.

If a technique of integration circuit that replaces an LSI appears in the future as a result of advancement of the semiconductor technique or appearance of another technique deriving from the semiconductor technique, integration of the functional blocks can be achieved by using such a technique. One possibility is application of biotechnology.

The wireless communication apparatus and method according to an aspect of the present disclosure is suitably used as a wireless communication apparatus and method that is able to perform directivity communication by using IQ signals corrected for quadrature errors, substantially without increasing the circuit scale.

What is claimed is:

1. A wireless communication apparatus comprising:
a plurality of antenna devices;
signal generating circuitry which, in operation, generates an IQ signal having an I signal and a Q signal;
a plurality of phase shifting circuitry, provided for each of the plurality of antenna devices, which, in operation, generates a plurality of combination signals by combining the I signal and the Q signal based on a combining scheme that includes rotate calculations for the IQ signal in a complex plane,
wherein the rotate calculations generate a new I signal of the combination signal by adding the I signal multiplied with a first control value and the Q signal multiplied with a second control value, and generate a new Q signal of the combination signal by adding the I signal multiplied with a third control value and the Q signal multiplied with a fourth control value;
phase controlling circuitry which, in operation, controls the combining scheme in each of the plurality of phase shifting circuitry by individually suppling the first through fourth control values to the phase shifting circuitry,
wherein the phase controlling circuitry includes:
a reference table that contains the first through fourth control values to be supplied to the phase shifting circuitry, the first through fourth values being provided for each pattern of directivity of the plurality of antenna devices,
phase setting circuitry which, in operation, sets a value of the phase for each of the plurality of antenna devices in accordance with a determined pattern of directivity, and
control value obtaining circuitry which, in operation, obtains the first through fourth control values corresponding to the set value of the phase by referring to the reference table and supplies the obtained first through fourth control values to the plurality of phase shifting circuitry; and
quadrature error correcting circuitry which, in operation, corrects at least one of amplitude combining scheme and phase combining scheme of the combining scheme in correcting the combining scheme,
wherein the quadrature error correcting circuitry includes phase error correcting circuitry which, in operation, modifies the obtained third and fourth control values, the modified third and fourth control values being supplied to each of the plurality of phase shifting circuitry.

2. The wireless communication apparatus according to claim 1, wherein
the quadrature error correcting circuitry includes
amplitude error correcting circuitry which, in operation, modifies the obtained first and second control values, the modified first and second control values being supplied to each of the phase shifting circuitry.

3. The wireless communication apparatus according to claim 1, wherein
the quadrature error correcting circuitry includes
amplitude error correcting circuitry, provided for each of the plurality of antenna devices, which, in operation corrects the amplitude of at least one of the I signal and the Q signal of the combination signal output from each of the phase shifting circuitry.

4. A wireless communication method using a plurality of antenna devices, comprising:
generating an IQ signal having an I signal and a Q signal;
generating a plurality of combination signals by combining the I signal and the Q signal based on combining scheme that includes rotate calculations for the IQ signal in a complex plane, by using a plurality of phase shifting circuitry,
wherein the rotate calculations generate a new I signal of the combination signal by adding the I signal multiplied with a first control value and the Q signal multiplied with a second control value, and generate a new Q signal of the combination signal by adding the I signal multiplied with a third control value and the Q signal multiplied with a fourth control value;
controlling the combining scheme in each of the plurality of phase shifting circuitry by using a reference table that contains the first through fourth control values to be supplied to the phase shifting circuitry, the first through fourth values being provided for each pattern of directivity of the plurality of antenna devices,
wherein the controlling includes:
setting a value of the phase for each of the plurality of antenna devices in accordance with a determined pattern of directivity, and
obtaining the first through fourth control values corresponding to the set value of the phase by referring to the reference table and suppling the obtained first through fourth control values to the plurality of phase shifting circuitry; and correcting at least one of amplitude combining scheme and phase combining scheme of the combining scheme in correcting the combining scheme in a quadrature error correction, wherein the quadrature error correction includes modifying the obtained third and fourth control values in the phase combining scheme, the modified third and fourth control values being supplied to each of the plurality of phase shifting circuitry.

5. The wireless communication method according to claim 4, wherein the quadrature error correction includes modifying the obtained first and second control values in the amplitude combining scheme, the modified first and second control values being supplied to each of the phase shifting circuitry.

6. The wireless communication method according to claim 4, wherein the quadrature error correction includes correcting the amplitude of at least one of the I signal and the Q signal of the combination signal output from each of the phase shifting circuitry in the amplitude combining scheme, for the plurality of antenna devices.

* * * * *